UNITED STATES PATENT OFFICE.

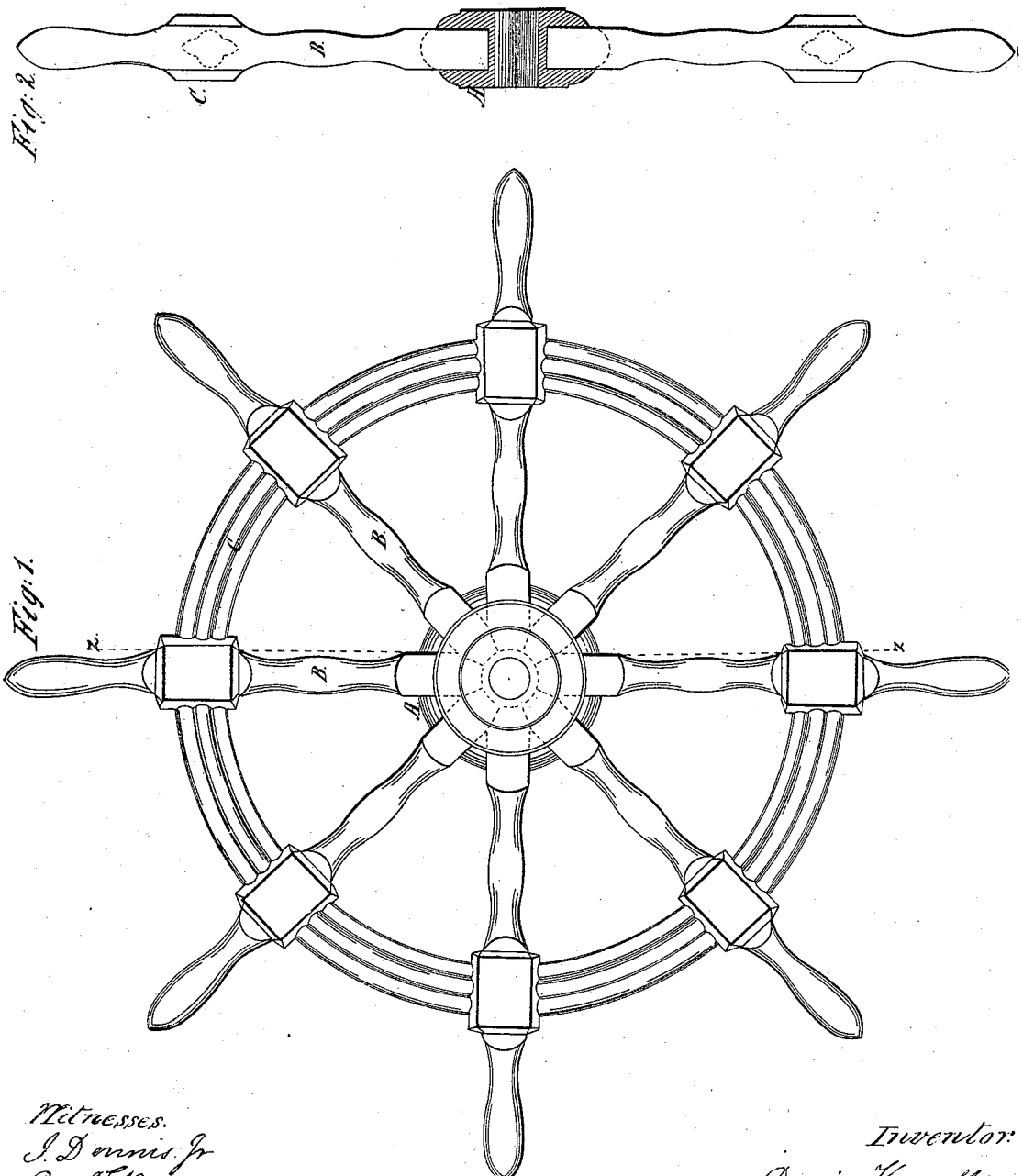

DAVID KNOWLTON, OF CAMDEN, MAINE.

STEERING-WHEEL.

Specification of Letters Patent No. 23,770, dated April 26, 1859.

*To all whom it may concern:*

Be it known that I, DAVID KNOWLTON, of Camden, in the county of Waldo and State of Maine, have invented a new and useful Improvement in Hand-Wheels for Steering Ships and other Purposes; and I do hereby declare that the same is described and represented in the following specification and drawings.

To enable others skilled in the art to make and use my improvement I will proceed to describe its construction and operation referring to the drawings in which the same letters indicate like parts in each of the figures.

Figure 1, is an elevation of a steering wheel with my improvements Fig. 2, is a section on the line $z$, $z$, of Fig. 1.

The nature of my invention consists in making a metal rim or circle and providing it with sockets for the wooden arms or spokes of the wheel; so that if one of the arms or spokes should be broken it could be readily removed without injuring the other parts of the wheel and its place supplied by a new arm or spoke without inconvenience or delay.

Prior to the date of my invention, the rims or circles of steering wheels were made of wood, and the spokes or arms were so fastened in, or to them, as to render it extremely difficult to remove an arm or spoke when broken without doing the rim or wheel great injury; which defect is entirely remedied by my improvements.

In the accompanying drawings A, is the hub of the wheel which I prefer to make of cast metal with holes or sockets for the ends of the arms B, B. The form of these sockets are shown in Fig. 2, and by dotted lines in Fig. 1. C, is a rim or circle made of cast metal in the form shown in the drawing and provided with sockets or holes for the arms B, B. These holes or sockets may be formed by placing cores in the mold when the rim is cast in the common mode well known and practiced by foundry men; and I prefer to make the holes in the rim a little larger than the holes in the hub, so that the ends of the arms inserted in the hub will pass freely through the holes in the rim.

The arms B, B, may be made in the form shown in the drawing or in such other form as may be preferred and fitted to the holes in the hub A, and rim C, and driven so as to remain firm and tight, and if desirable may be fastened by pins or screws in the hub or rim or both.

If at any time the handle of one of the arms should be broken it may be easily removed and a new one put in its place with great facility without injuring any other part of the wheel.

My improvements enable me to make a far better and more desirable hand wheel, at about one third of the cost of the hand wheels made prior to the date of my invention.

I believe I have described and represented my improvements in hand wheels for steering ships and other purposes, so as to enable any person skilled in the art to make and use it, I will now state what I desire to secure by Letters Patent to wit:

What I claim as my improvement in the above described hand wheel for steering ships and other purposes, is—

The metal rim or circle provided with sockets for the wooden arms or spokes of the wheel substantially as described.

DAVID KNOWLTON.

Witnesses:
I. DENNIS, Jr.
EDW. F. BROWN.